US012723795B2

(12) United States Patent
Knatt et al.

(10) Patent No.: US 12,723,795 B2
(45) Date of Patent: Sep. 1, 2026

(54) SANITARY EVAPORATOR ASSEMBLY

(71) Applicant: True Manufacturing Co, Inc., O'Fallon, MO (US)

(72) Inventors: Kevin Knatt, St. Louis, MO (US); Edward Hartman, Wentzville, MO (US)

(73) Assignee: TRUE MANUFACTURING CO., INC., O'Fallon, MO (US)

( * ) Notice: Subject to any disclaimer, the term of this patent is extended or adjusted under 35 U.S.C. 154(b) by 55 days.

(21) Appl. No.: 18/884,358

(22) Filed: Sep. 13, 2024

(65) Prior Publication Data

US 2025/0020381 A1 Jan. 16, 2025

Related U.S. Application Data

(63) Continuation of application No. 18/508,281, filed on Nov. 14, 2023, now Pat. No. 12,117,224, which is a (Continued)

(51) Int. Cl.

*F25C 1/12* (2006.01)
*B23P 15/26* (2006.01)
(Continued)

(52) U.S. Cl.

CPC ................ *F25C 1/12* (2013.01); *B23P 15/26* (2013.01); *F25B 39/00* (2013.01); *F25B 39/02* (2013.01);
(Continued)

(58) Field of Classification Search

CPC .... F25C 1/12; F25C 5/08; F25D 21/14; F25B 41/00; F25B 39/02; F25B 39/00;
(Continued)

(56) References Cited

U.S. PATENT DOCUMENTS 2,741,095 A 4/1956 Jacobs
4,344,299 A 8/1982 Latzer
(Continued)

FOREIGN PATENT DOCUMENTS

CN 2364412 2/2000
CN 2426118 Y 4/2001
(Continued)

OTHER PUBLICATIONS

Patent Cooperation Treaty, International Search Report for PCT/US2017/062683 dated Mar. 12, 2018, 3 pages.
(Continued)

*Primary Examiner* — Elizabeth J Martin
(74) *Attorney, Agent, or Firm* — Stinson LLP

(57) ABSTRACT

An ice maker evaporator assembly having an evaporator pan with a back wall and left, right, top and bottom sidewalls extending from the back wall, and a freeze plate located within the evaporator pan. Refrigerant tubing is thermally coupled to the back wall of the evaporator pan opposite the left, right, top and bottom sidewalls. A first layer of insulation is formed on the refrigerant tubing. An evaporator housing having a housing back wall and housing left, right, top and bottom sidewalls extending from the housing back wall is attached to the evaporator pan and covers refrigerant tubing. A second layer of insulation is formed on top of the first layer of insulation.

20 Claims, 12 Drawing Sheets

Related U.S. Application Data continuation of application No. 18/178,322, filed on Mar. 3, 2023, now Pat. No. 11,821,669, which is a continuation of application No. 17/319,209, filed on May 13, 2021, now Pat. No. 11,668,507, which is a continuation of application No. 16/746,823, filed on Jan. 18, 2020, now Pat. No. 11,054,180, which is a continuation of application No. 15/819,132, filed on Nov. 21, 2017, now Pat. No. 10,571,180.

(60) Provisional application No. 62/425,905, filed on Nov. 23, 2016.

(51) Int. Cl.
*F25B 39/00* (2006.01)
*F25B 39/02* (2006.01)

(52) U.S. Cl.
CPC ....... *F25B 39/022* (2013.01); *F25B 2339/023* (2013.01)

(58) Field of Classification Search
CPC ..... F25B 39/022; F25B 2339/023; F28F 3/00; F28F 1/00; F28F 1/022; F28D 1/047; B23P 15/28
See application file for complete search history.

(56) References Cited

U.S. PATENT DOCUMENTS

| | | | | |
|---|---|---|---|---|
| 4,733,549 | A | 3/1988 | Josten et al. | |
| 4,949,554 | A | 8/1990 | Branz et al. | |
| 5,291,752 | A | 3/1994 | Alvarez et al. | |
| 6,205,807 | B1 | 3/2001 | Broadbent | |
| 7,703,299 | B2 | 4/2010 | Schlosser et al. | |
| 8,250,881 | B1 | 8/2012 | Reihl | |
| 2003/0000232 | A1 | 1/2003 | Goth et al. | |
| 2003/0167783 | A1 | 9/2003 | Goth et al. | |
| 2004/0237565 | A1 | 12/2004 | Lee et al. | |
| 2006/0288725 | A1* | 12/2006 | Schlosser ................ | F28F 1/022 62/347 |
| 2006/0288726 | A1 | 12/2006 | Mori et al. | |
| 2007/0101753 | A1 | 5/2007 | Broadbent | |
| 2012/0324917 | A1* | 12/2012 | Bortoletto ................ | F25C 5/08 62/340 |
| 2013/0098074 | A1 | 4/2013 | Hegedus et al. | |
| 2013/0340462 | A1 | 12/2013 | Bush et al. | |
| 2016/0146524 | A1 | 5/2016 | Bortoletto et al. | |

FOREIGN PATENT DOCUMENTS

| | | | |
|---|---|---|---|
| CN | 101287953 | A | 10/2008 |
| CN | 205298959 | U | 6/2016 |
| CN | 106369882 | | 2/2017 |
| EP | 1790922 | | 5/2007 |
| JP | H05312447 | A | 11/1993 |
| JP | 2006162163 | A | 6/2006 |
| WO | 2002/103262 | A1 | 12/2002 |

OTHER PUBLICATIONS

Chinese Office Action, and translation thereof, from CN Application No. 202110858862.8, dated Sep. 1, 2022, 12 pages.

* cited by examiner

SANITARY EVAPORATOR ASSEMBLY

REFERENCE TO RELATED APPLICATIONS

This application is a continuation of U.S. application Ser. No. 18/508,281, filed Nov. 14, 2023, which is a continuation of U.S. application Ser. No. 18/178,322, filed Mar. 3, 2023, now issued U.S. Pat. No. 11,821,669, issued Nov. 21, 2023, which is a continuation of U.S. application Ser. No. 17/319,209, filed May 13, 2021, now issued U.S. Pat. No. 11,668,507, issued Jun. 6, 1023, which is a continuation of U.S. application Ser. No. 16/746,823, filed Jan. 18, 2020, now issued U.S. Pat. No. 11,054,180, issued Jul. 6, 2020, which is a continuation of U.S. application Ser. No. 15/819,132, filed Nov. 21, 2017, now issued U.S. Pat. No. 10,571,180, issued Feb. 25, 2020, all of which claim priority to U.S. Provisional Application No. 62,425,905, filed Nov. 23, 2016, the contents of each of which are incorporated herein in their entirety.

FIELD OF THE INVENTION

This invention relates generally to ice makers and, more particularly, to an evaporator assembly for an ice maker.

BACKGROUND OF THE INVENTION

Ice making machines, or ice makers, typically comprise a refrigeration and ice making system that employs a source of refrigerant flowing serially through a compressor, a heat rejecting heat exchanger (e.g., a condenser), a refrigerant expansion device, and an evaporator assembly including a freeze plate comprising a lattice-type cube mold. Additionally, typical ice makers employ gravity water flow and ice harvest systems that are well known and in extensive use. Ice makers having such a refrigeration and ice making system are often disposed on top of ice storage bins, where ice that has been harvested is stored until it is needed. Such ice makers may also be of the “self-contained” type wherein the ice maker and ice storage bin are contained in a single unit. Such ice makers have received wide acceptance and are particularly desirable for commercial installations such as restaurants, bars, hotels and various beverage retailers having a high and continuous demand for fresh ice.

In these ice makers, water is supplied at the top of an evaporator assembly which directs the water in a tortuous path toward a water pump. A portion of the supplied water collects on the freeze plate, freezes into ice and is identified as sufficiently frozen by suitable means whereupon the freeze plate is defrosted such that the ice is slightly melted and discharged therefrom into an ice storage bin. Typically, these ice machines can be classified according to the type of ice they make. One such type is a grid style ice maker which makes generally square ice cubes that form within individual grids of the freeze plate which then form into a continuous sheet of ice cubes as the thickness of the ice increases beyond that of the freeze plate. After harvesting, the sheet of ice cubes will break into individual cubes as they fall into the ice storage bin. Another type of ice maker is an individual ice cube maker which makes generally square ice cubes that form within individual grids of the freeze plate which do not form into a continuous sheet of ice cubes. Therefore, upon harvest individual ice cubes fall from the freeze plate and into the ice storage bin. Control means are provided to control the operation of the ice maker to ensure a constant supply of ice. Various embodiments of the invention can be adapted to either type of ice maker, and to others not identified, without departing from the scope of the invention.

Typical ice makers have extraneous heat transfer on the back surfaces of the evaporator assembly in which energy or heat is removed from the air inside the ice maker rather than from the water to be frozen into ice. This extraneous heat transfer represents inefficiency in typical ice makers. Additionally, evaporator assemblies in typical ice makers will condense and freeze moisture in the air inside the ice maker and/or will create frost on the back of the evaporator assembly where there is exposed copper. This presents another route for extraneous heat transfer as energy is transferred to condense and freeze airborne water or to create frost rather than cooling the water to be frozen into ice. Then, when warm refrigerant is directed through the serpentine tube of typical evaporators to harvest ice from the evaporator, a portion of the energy that is intended for melting the ice will instead be absorbed by the frost on the back side of the evaporator. Again, this extraneous heat transfer reduces the efficiency of typical ice makers.

Certain ice makers, particularly those of the flaked, pellet, and nugget continuous-extrude type ice makers may include foam insulation surrounding the refrigerant tubing. However, one cannot simply use blown insulation by itself, because polyurethane is only 90% closed cell. The remaining 10% may fill with moisture overtime and ultimately break down the entire foam. The soggy foam (now frozen) would potentially render the ice maker un-harvestable, leading to catastrophic failure.

Another issue with typical ice makers is that any water that contacts and/or resides on the back side of the evaporator (e.g., from water leaks, condensation, and/or frost formation) creates a potential for damage to the evaporator from the expansion and contraction associated with the freezing and thawing of such water. The presence of this moisture also increases the possibility for corrosion of the evaporator.

Furthermore, the air inside a typical ice maker can be contaminated with airborne contaminants from the ambient environment (e.g., restaurant, hospital, bar, etc.). In typical ice makers, the back side of the evaporator is exposed to these contaminants and the backside of the evaporator typically does not get cleaned due to a lack of access and a lack of instruction on how to clean the back side of the evaporator. Accordingly, there can be a buildup of biological contaminants on the back side of typical evaporators. When the backside of the evaporator then condenses moisture and drips into the ice maker, the sump below the evaporator, and/or the ice storage bin below the ice maker, that dripping condensation may contain biological contaminants and thus may contaminate the ice making water and/or the produced ice. As a result of this and because the back side of the evaporator is considered in the food zone of typical ice makers, the back side of the evaporator should be cleaned periodically. This cleaning step can be a difficult, expensive, and/or undesirable step. Consequently, the cleaning of the back side of the evaporators of typical ice makers is rarely, if ever, done.

SUMMARY OF THE INVENTION

One aspect of the invention is directed to an evaporator assembly for an ice maker, the evaporator assembly having an evaporator, an evaporator pan, and an evaporator housing. The evaporator has a front side and a back side and includes a rectangular evaporator pan comprising a back wall and left, right, top and bottom sidewalls extending from the back wall. Attached to the back side of the evaporator pan is a serpentine tube through which cold refrigerant flows to lower the temperature of the evaporator so that ice can be formed therein. A first layer of insulation is formed on the serpentine tubing. An evaporator housing having a housing back wall and housing left, right, top and bottom sidewalls extending from the housing back wall is attached to the evaporator pan and covers serpentine tubing. A second layer of insulation is formed on top of the first layer of insulation, for example, by pouring a flexible, liquid coating on the tubing and allowing the coating to cure and substantially cover the tubing. The evaporator assembly further includes an evaporator housing comprising a housing back wall and housing left, right, top and bottom sidewalls extending from the housing back wall, such that the housing covers and tubing and forms a cavity therein. The cavity may be filed with a second insulating material.

BRIEF DESCRIPTION OF THE FIGURES

These and other features, aspects and advantages of the invention will become more fully apparent from the following detailed description, appended claims, and accompanying drawings, wherein the drawings illustrate features in accordance with exemplary embodiments of the invention, and wherein:

Like reference numerals indicate corresponding parts throughout the several views of the drawings.

DETAILED DESCRIPTION

Figure 1:
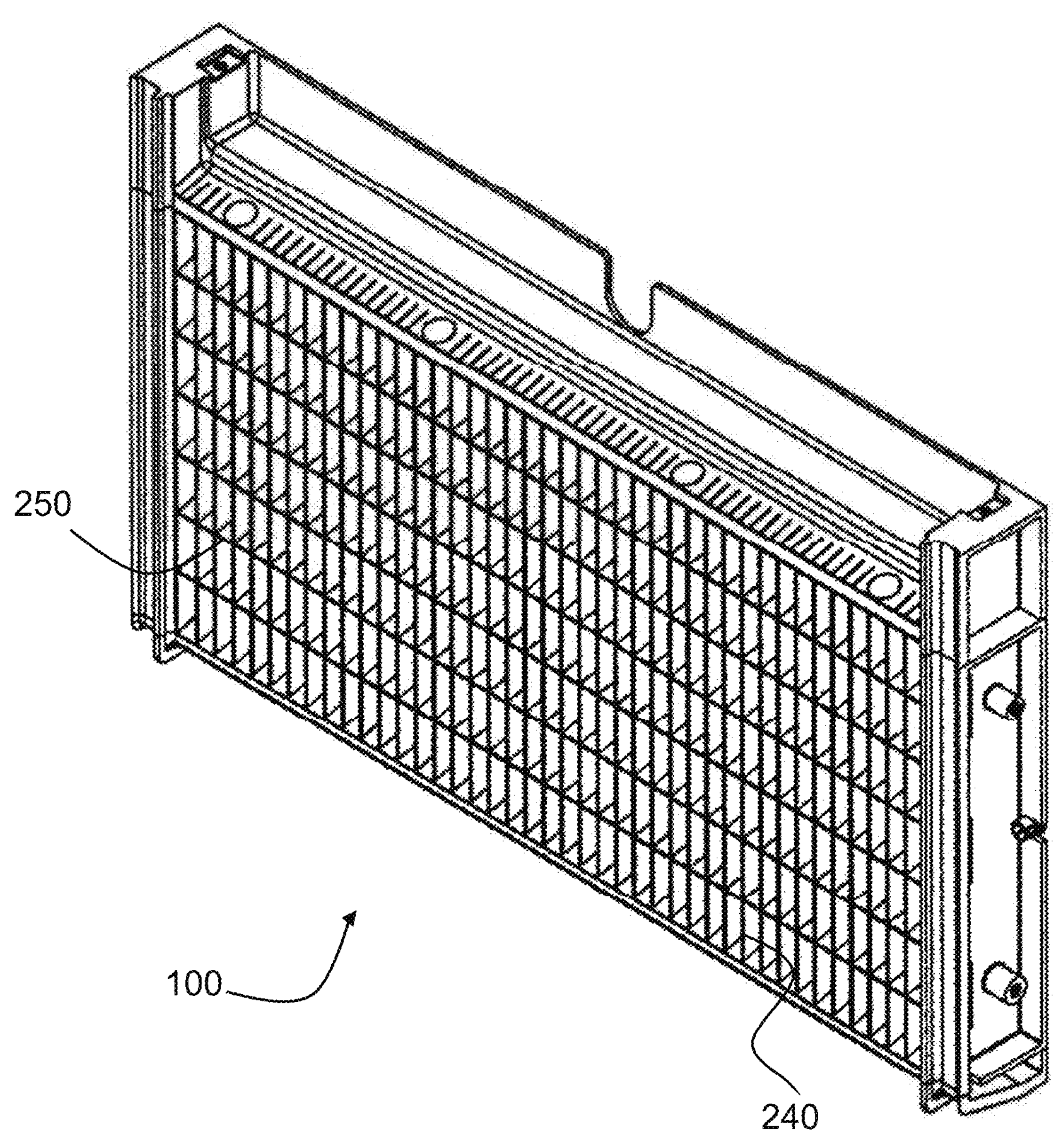
FIG. 1 is a right perspective view of an evaporator assembly according to one embodiment of the invention.
Figure 2:
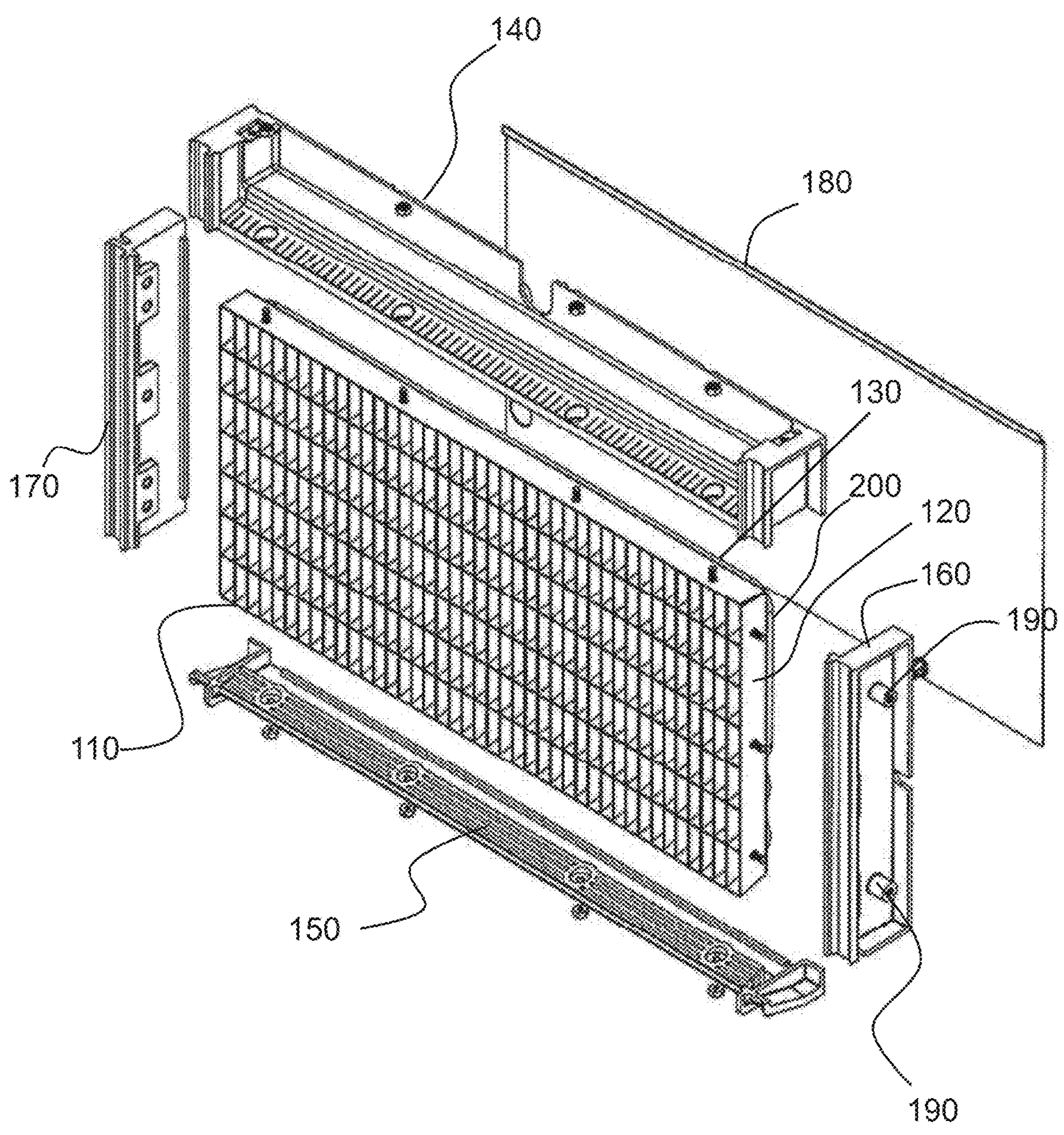
FIG. 2 is an exploded right perspective view of an evaporator assembly according to one embodiment of the invention.
Figure 3:
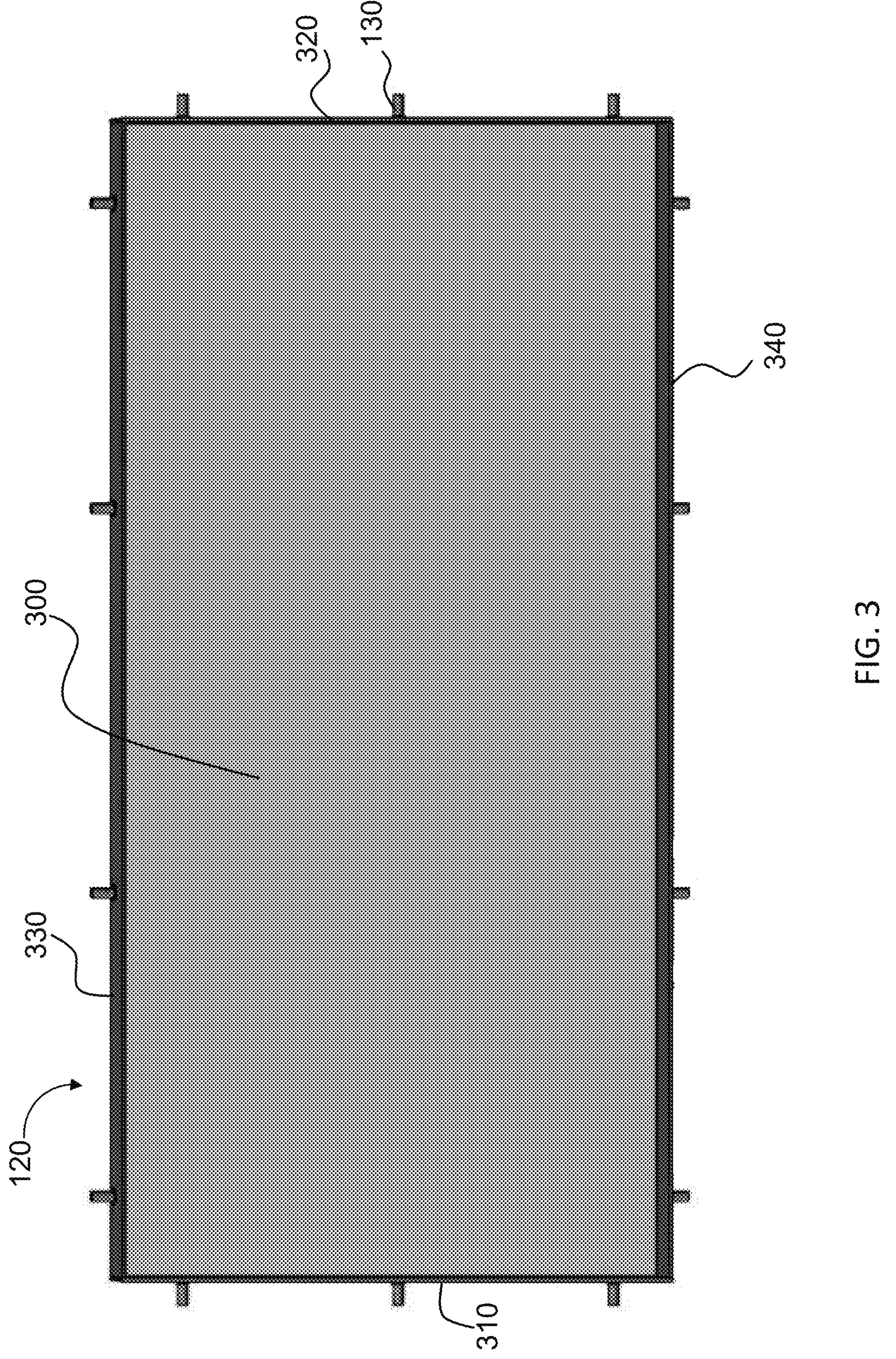
FIG. 3 is a front view of an evaporator pan according to one embodiment of the invention.
Figure 4:
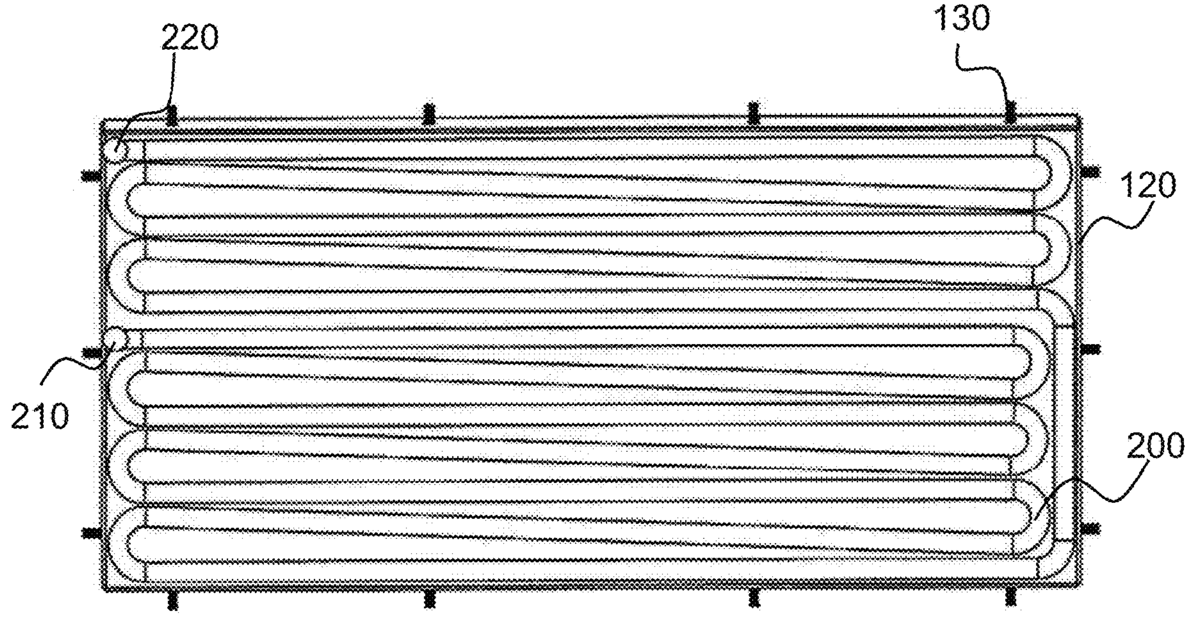
FIG. 4 is a back view of an evaporator according to one embodiment of the invention.
Figure 5:
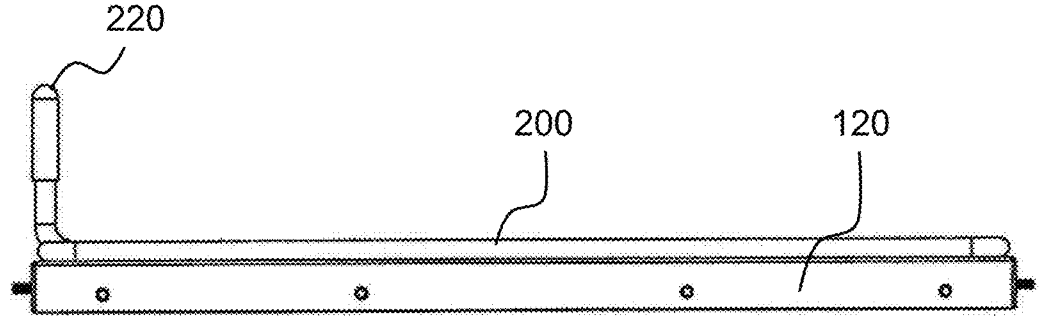
FIG. 5 is a right view of an evaporator according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. All numbers expressing measurements and so forth used in the specification and claims are to be understood as being modified in all instances by the term "about." It should also be noted that any references herein to front and back, right and left, top and bottom and upper and lower are intended for convenience of description, not to limit an invention disclosed herein or its components to any one positional or spatial orientation.

As described herein, embodiments of the invention are directed to an evaporator assembly wherein the back side of the evaporator is covered, insulated, exempt from NSF regulations, and protected from heat loss and the damaging effect of the water and corrosion. Because the back side of the evaporator is covered, it does not need to be plated (with electroless nickel, for example), saving considerable cost and it cannot contaminate the ice making water.

With reference to FIGS. 1-6, an embodiment of evaporator assembly 100 is described. Evaporator assembly 100 includes evaporator 110 and an evaporator housing formed by housing top 140, bottom 150, sides 160 and 170, and back 180. Preferably, the top 140, bottom 150, sides 160 and 170, and back 180 of the evaporator housing are plastic. The top 140, bottom 150, sides 160 and 170, and back 180 of the evaporator housing may have features allowing them to be assembled together in a variety of ways, including snap-fit features, bolts and nuts, etc. The inner surfaces of the top 140, bottom 150, sides 160 and 170 may include a gasket material to aid in sealing the evaporator housing water tight. Evaporator 110 includes an evaporator pan 120 having a back wall 300 and a left sidewall 310, a right sidewall 320, a top sidewall 330, and a bottom sidewall 340 extending from back wall 300 toward the front side of evaporator 110. Left, right, and top sidewalls 310, 330, 320, are substantially perpendicular to back wall 300 while bottom sidewall 340 preferably angles slightly downward. The evaporator pan 120 includes a series of studs 130 that may be used to mount evaporator assembly 100 to an internal structure of the ice maker (not shown). The evaporator housing may have corresponding mating openings 190, through which the studs 130 may pass.

A population of vertical and horizontal strips 240, 250 are secured in evaporator pan 120 to form a lattice of ice cube "molds." Evaporator pan 120 with vertical and horizontal strips 240, 250 may also be called a freeze plate. Attached to the back side of back wall 300 of evaporator pan 120 is a serpentine tube 200 through which cold refrigerant flows to lower the temperature of evaporator 110 so that ice can be formed therein. Serpentine tube 200 includes inlet tube 220 and outlet tube 210 which extend through evaporator assembly 100, as described more fully elsewhere herein. Locating the inlet tube 220 at the bottom of the evaporator assembly 100 assists in ensuring an even distribution of temperature across the evaporator. The serpentine tube 200 may be attached to the back side of back wall 300 of the evaporator pan 120 in a number of conventional ways, including using a soldering or brazing process.

The components of evaporator 110 are preferably formed of copper. To satisfy the water contact cleanliness requirements of NSF for commercial ice machines, all areas of evaporator 110 that are considered to be in the "food zone" of the ice maker cannot be bare copper and thus must be plated. Any portion of evaporator 110 that could potentially drip water into the food zone is considered to be inside the food zone and must comply with this requirement. Because of this requirement, typical ice machine evaporators must be completely plated such that no un-plated, bare copper surfaces are exposed. Typical evaporators are exposed on all sides, thus the entire surface of typical evaporators-front and back-must be plated. This plating, typically a thin layer of electroless nickel (EN), is quite expensive, costing roughly as much as the rest of the evaporator. As described more fully elsewhere herein, because the back side of evaporator 110 is covered by evaporator housing, the back side of evaporator 110 does not need to be plated. Thus only the front side of back wall 300, sidewalls 310, 320, 330, and 340 of evaporator pan 120 are plated. The back side of back wall 300 and serpentine tubing 200 are not required to be plated.

Figure 6:
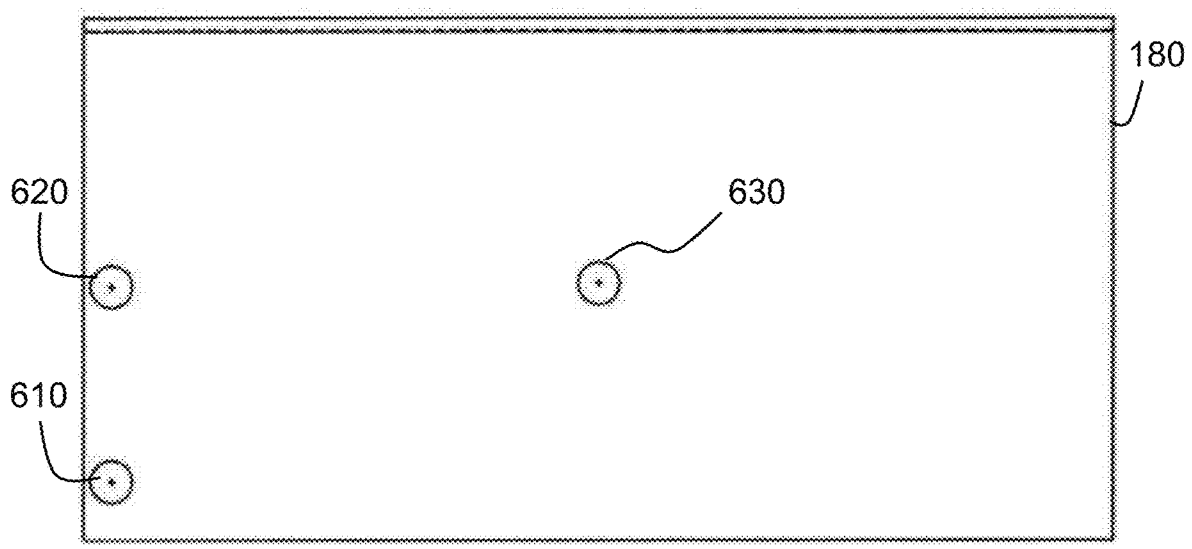
FIG. 6 is a rear view of an evaporator housing according to one embodiment of the invention.

Referring now to FIG. 6, two passageways 610, 620 extend through back wall 180 of evaporator housing. Passageways 610, 620 permit inlet and outlet tubes 220, 210, respectively, of serpentine tube 200 to pass through back wall 300 of the evaporator housing such that serpentine tube 200 can be coupled with the remaining components of the refrigeration system of an ice maker (not shown). Passageways 610, 620 are preferably circular in shape; however, passageways may be rectangular, square, ovular, etc. without departing from the scope of the invention. Rubber grommets (not shown) may be inserted into passageways 610, 620 to seal any gap between passageways 610, 620 and inlet and outlet tubes 220, 210, respectively, of serpentine tube 200. In certain embodiments, a caulk or sealant may be used in addition to or in place of grommets to seal any gap between passageways 610, 620 and inlet and outlet tubes 220, 210.

A third passageway 630 may be provided in the back wall 180 in order to inject insulating material into the interior of the evaporator housing assembly 100 as described below.

Figure 7:
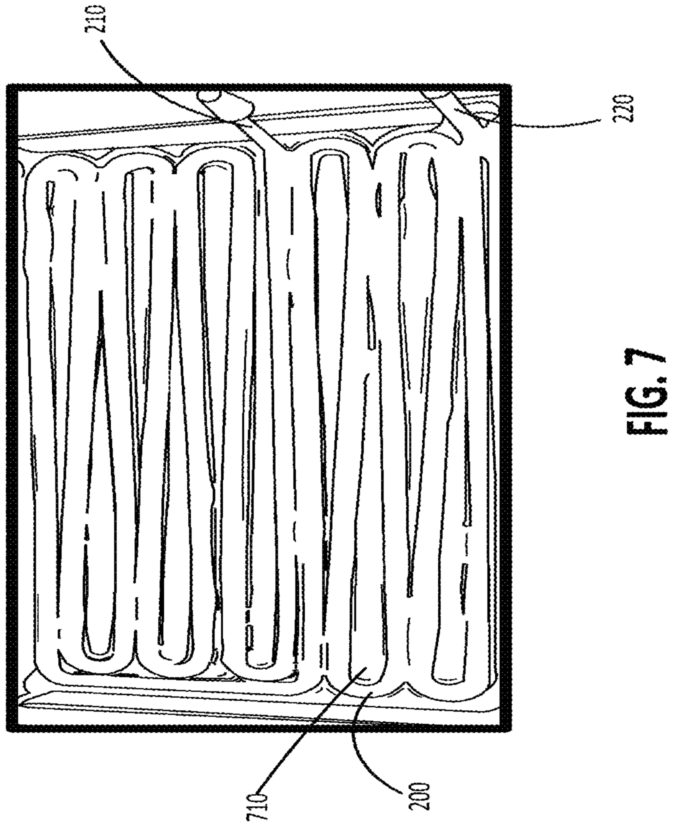
FIG. 7 illustrates a refrigerant tubing covered by a first pourable insulation in accordance with one embodiment of the invention.
Figure 8:
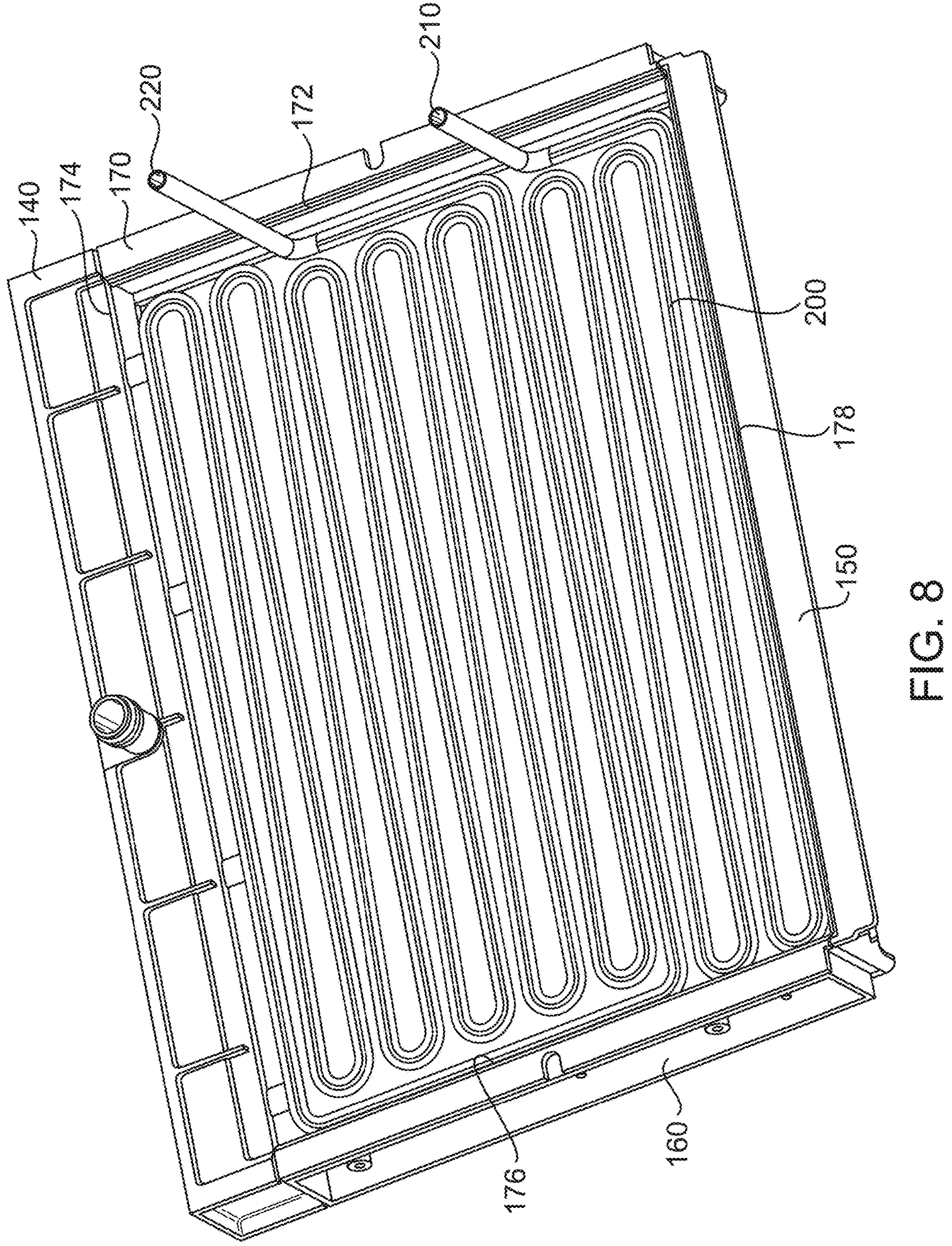
FIG. 8 is a rear perspective view of an evaporator assembly according to an embodiment of the invention.

As illustrated in FIG. 7, the evaporator assembly 100 further includes an insulating material 710 layered over at least a majority of the length of the serpentine tube 200. The insulating material 710 minimizes the amount of heat dissipated by the serpentine tube 200 and provides a water-tight seal. Preferably, the insulating material 710 is a heavy-bodied, water-based, vinyl acrylic, general-purpose mastic that is typically used in both interior and exterior insulation systems. Examples of insulating material 710 include two-part silicone materials such as QSil 550 from Quantum Silicones LLC of Richmond, VA.

Preferably, the insulating material 710 is applied in liquid form onto the serpentine tubing 200 to a thickness of approximately about 5 mm to about 12 mm. The insulating material 710 then cures, forming an integral layer of insulation that is impervious to water. In addition, the integral layer of insulation has no joints through which water can leak, will not rust, and adds rigidity and strength. As the insulating material 710 is poured in a liquid form, it cures into a mold that matches the geometry of the serpentine tubing 340 and can fill in all gaps within the back side of the evaporator pan.

After attaching the serpentine tube 200 to the evaporator pan 120, and adding the insulating material 710 surrounding the serpentine tube 200, the evaporator assembly 100 may be assembled. Thus the five components of the evaporator housing, namely housing top 140, bottom 150, sides 160 and 170, and back 180 may be assembled together surrounding the evaporator pan 110 in order to form the complete assembly 100. Forming the assembly results in a cavity formed between the back side of evaporator 110 (holding the serpentine tube 200) and the front side of back wall 180 of evaporator housing, and further enclosed by the housing top 140, bottom 150 and sides 160 and 170.

Figure 9:
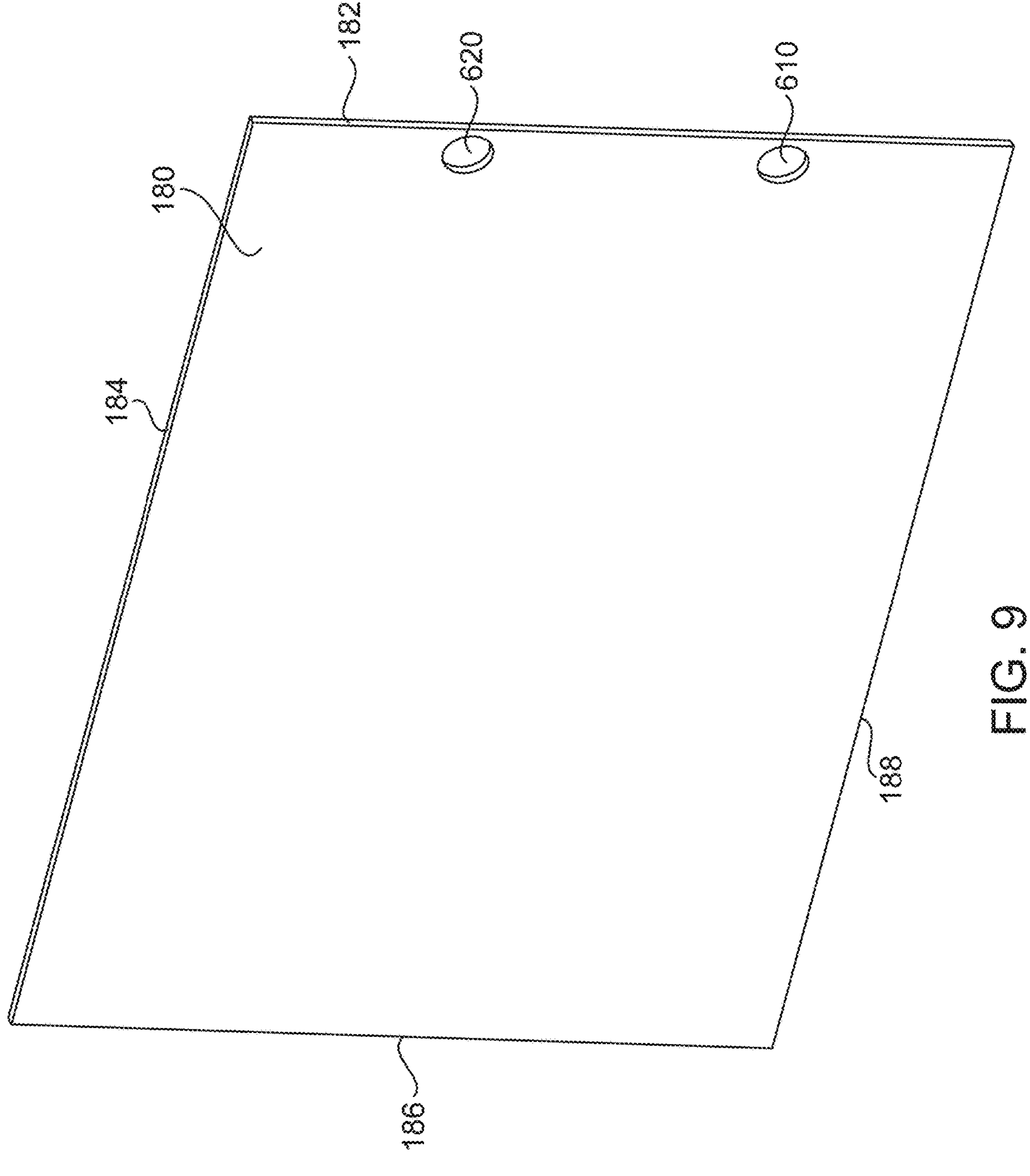
FIG. 9 is a perspective view of a back wall of an evaporator housing according to an embodiment of the invention.
Figure 10:
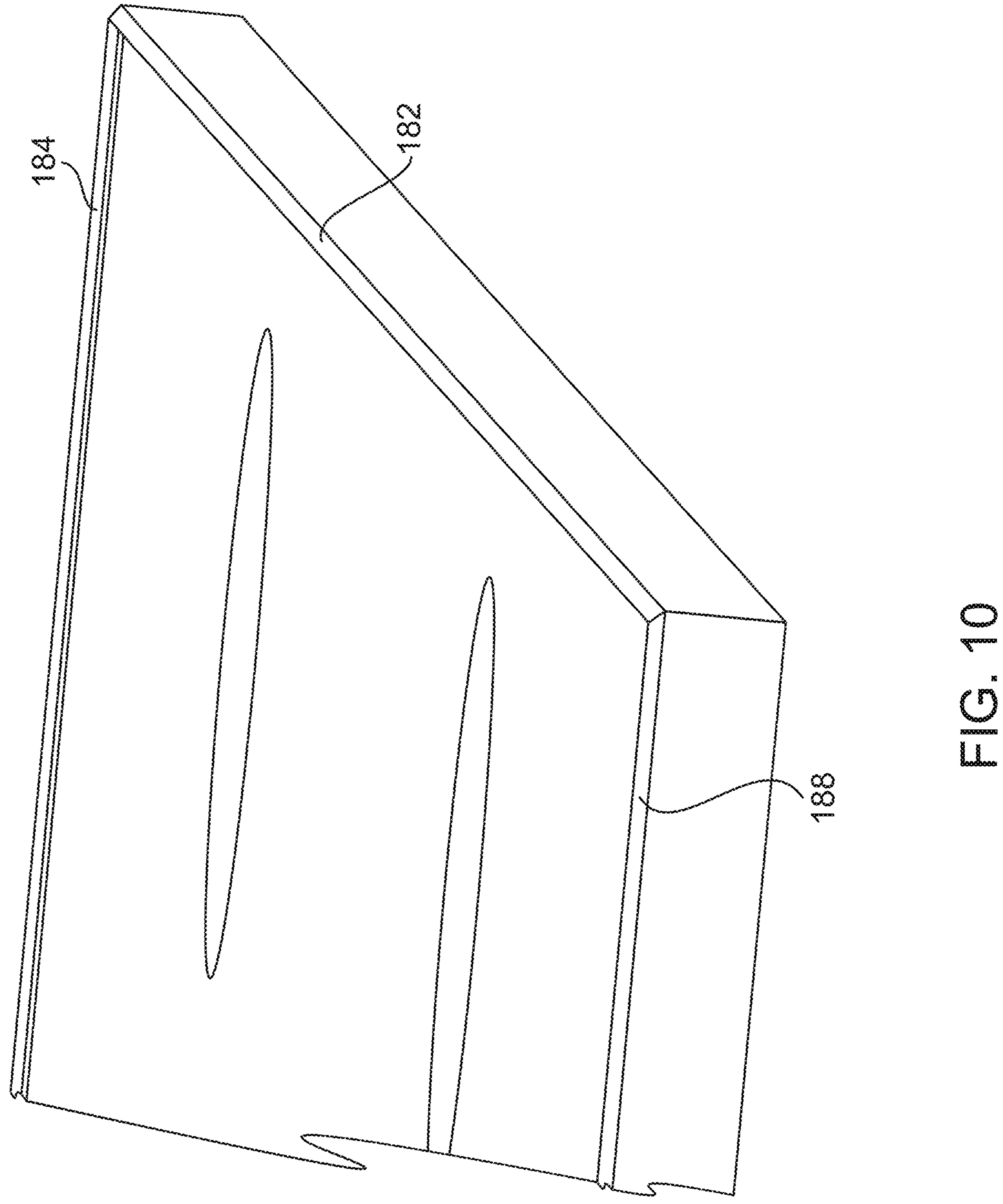
FIG. 10 is an exploded perspective view of a back wall of an evaporator housing according to an embodiment of the invention.
Figure 11:
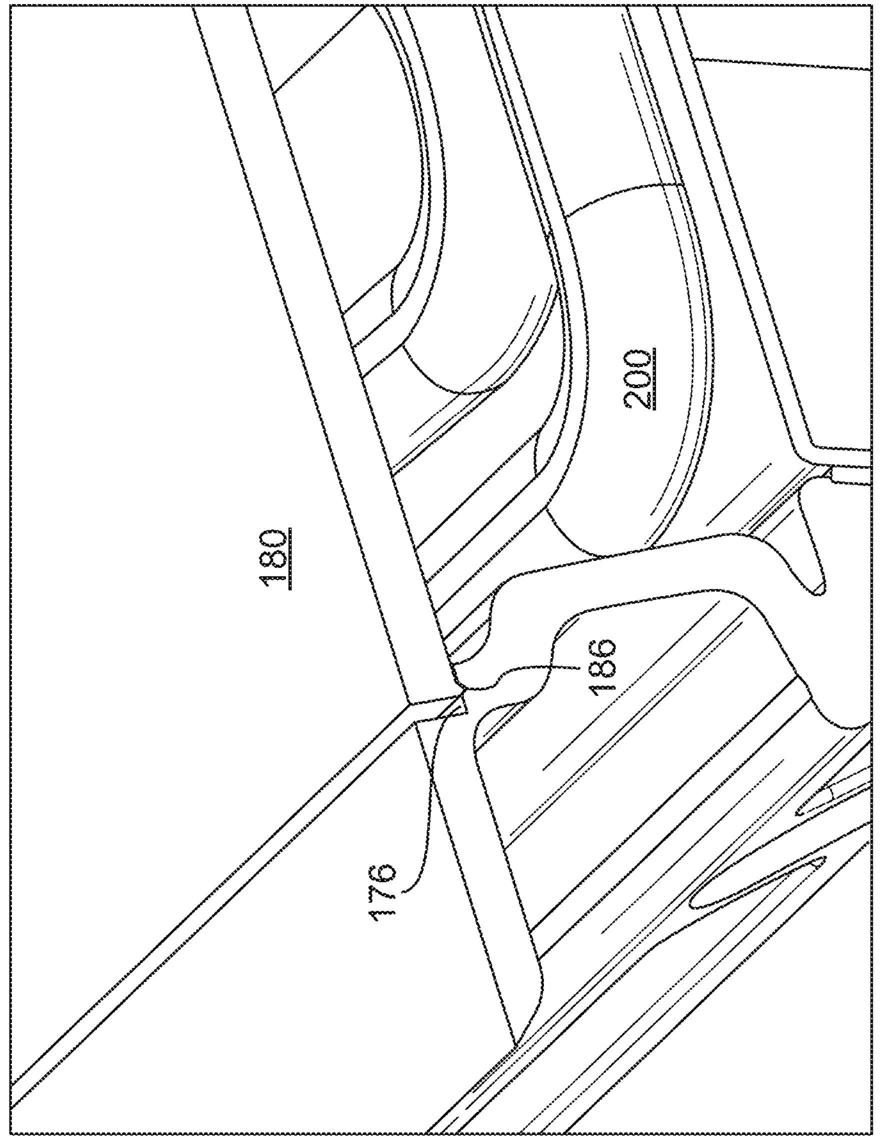
FIG. 11 is an exploded perspective view of an evaporator housing according to an embodiment of the invention.
Figure 12:
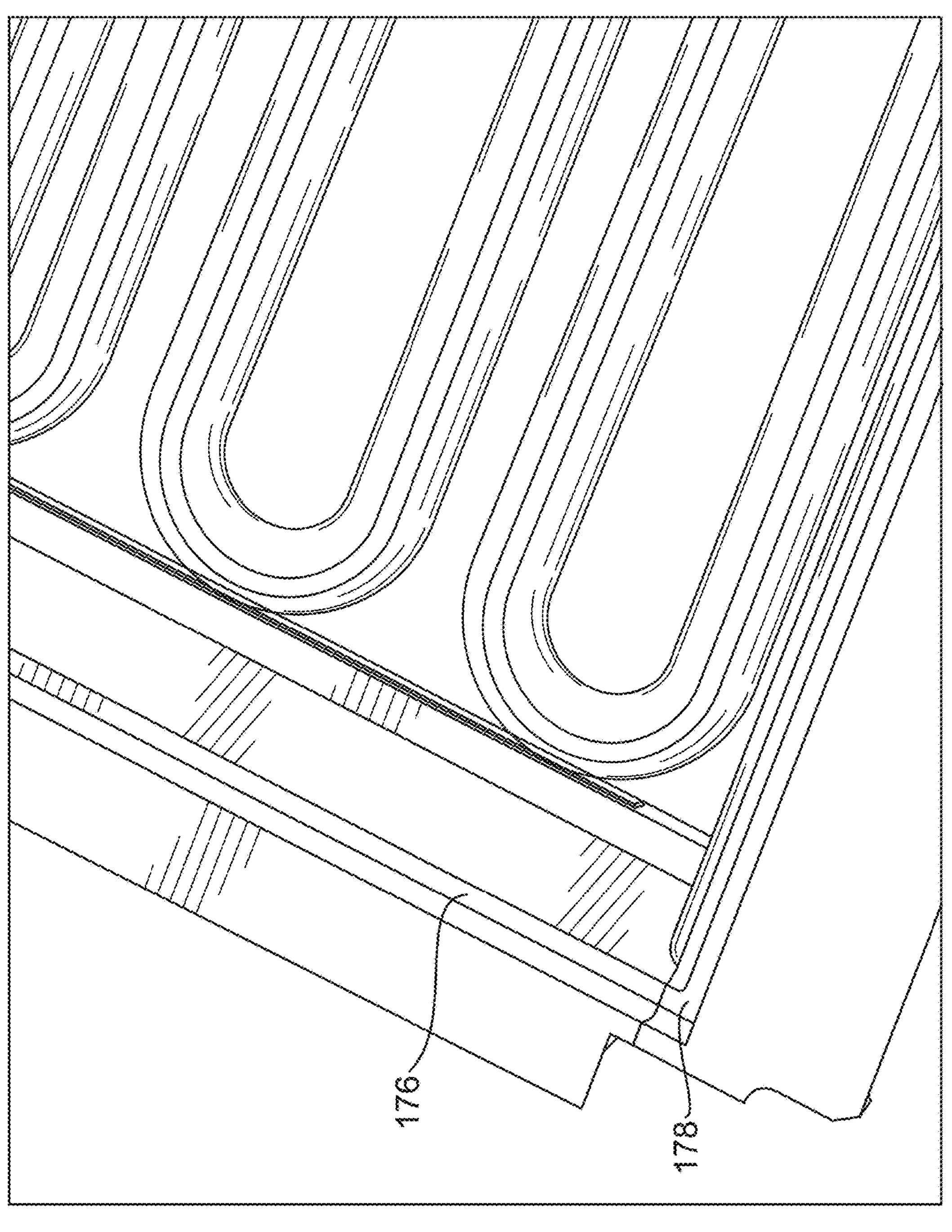
FIG. 12 is an exploded perspective view of portions of an evaporator housing according to an embodiment of the invention.

As illustrated in FIGS. 8-13, in certain embodiments, the back 180 may include one or more raised edges 182, 184, 186, and 188. As shown in FIGS. 9 and 10, the raised edges 182, 184, 186, and 188 preferably surround the perimeter of the back 180. The raised edges 182, 184, 186, and 188 extend outwardly away from the inner surface of the back 180 (i.e., the surface facing the serpentine tube 200). As shown in FIGS. 11 and 12, the raised edges 182, 184, 186, and 188 initially rest within grooves 172, 174, 176, and 178 formed in the top 140, bottom 150, and sides 160 and 170.

Figure 13:
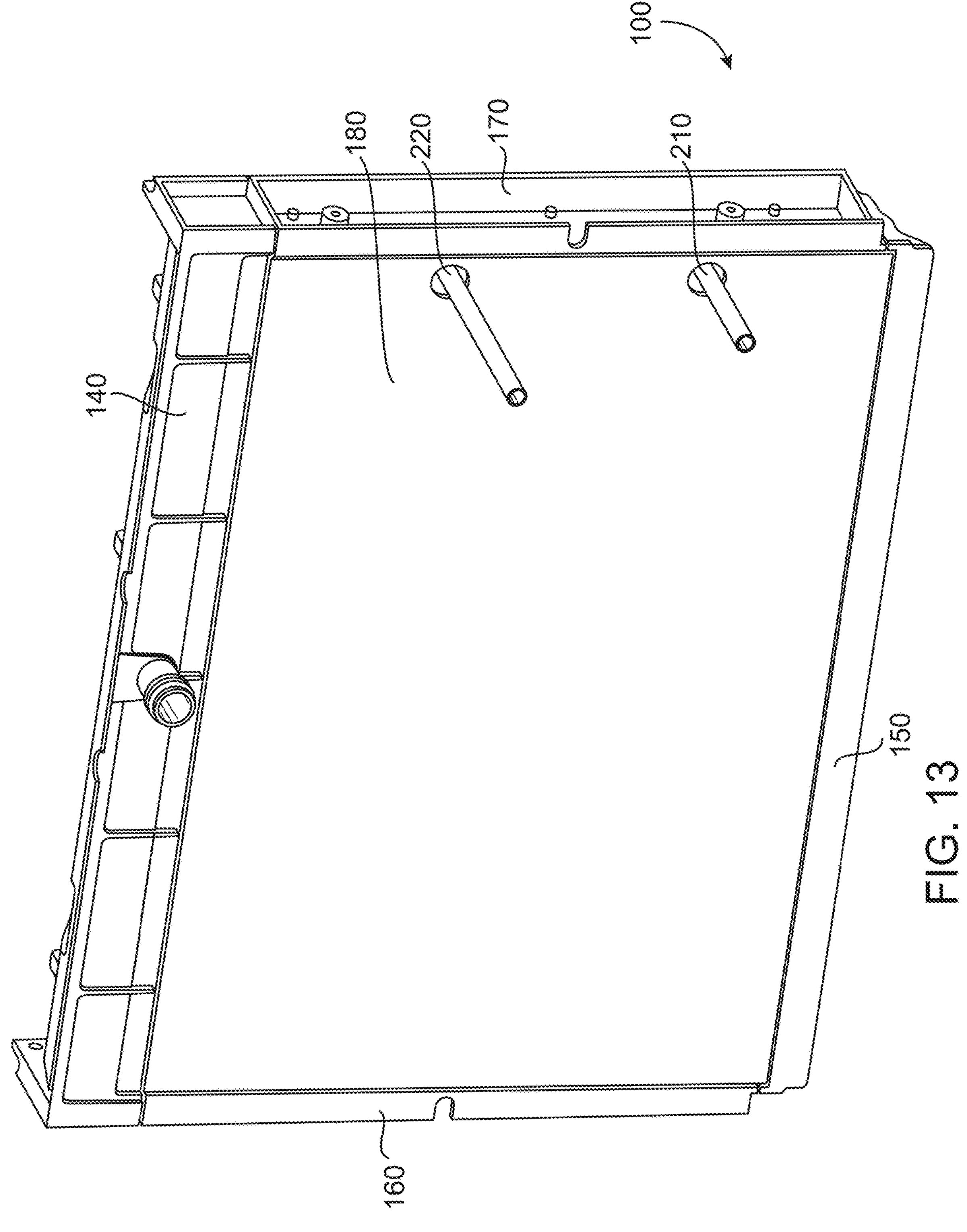
FIG. 13 is a perspective view of the back side of the evaporator housing according to an embodiment of the invention.

The back 180 may then be ultrasonically welded to the top 140, bottom 150, and sides 160 and 170 in order to seal the entire assembly together as shown in FIG. 13. The raised edges 182, 184, 186, and 188, which may be a raised triangular bead of material molded onto the surface of the back 180, concentrate the ultrasonic energy to rapidly initiate the softening and melting of the surface of the back 180 and grooves 172, 174, 176, and 178 as is known to those skilled in the art of ultrasonic welding. During welding, the raised edges 182, 184, 186, and 188 melt flat to seal the back 180 into the grooves 172, 174, 176, and 178.

In various embodiments, the cavity may be filled with foam after evaporator assembly 100 is assembled. The foam may be open- or closed-cell foam comprised, for example, of polystyrene or polyurethane, etc. Preferably, the foam is an expanding-type foam that can be sprayed into the cavity through passage 630. The foam preferably conforms to the back side of evaporator 110 so that it covers all or substantially all of the back side of evaporator pan 120 and the insulated serpentine tube 200 and fills all or substantially all of cavity. The foam may be sprayed into cavity after evaporator 110 and evaporator housing are assembled together. Another acceptable form is a two-part liquid form sold under the brand name Ecomate, in which the two parts mix and cure in place. After cavity is filled with sufficient amount of foam, a plug (not shown) may be inserted into or over the passageway 630 and may be held and sealed in place by the foam inside cavity. Additionally or alternatively, the plug may be held in by any type of sealant and/or adhesive, including, but not limited to, silicone caulk.

Filling the cavity provides insulation to the back side of evaporator 110 thus reducing or eliminating extraneous heat transfer on the back side of evaporator 110 which is common with typical evaporators as described more fully elsewhere herein. Consequently, filing the cavity with foam reduces or eliminates the possibility for condensation or frost to form on the back side of evaporator 110, reduces or eliminates the possibility of the back side of evaporator 110 corroding, and increases the efficiency of both forming and harvesting ice cubes from evaporator pan 120 because extraneous heat on the back side of evaporator 110 is essentially eliminated. Furthermore, the foam within the cavity is completely protected from any moisture condensing on the serpentine tubing 200 by the insulating material 710. As an alternative to filling the cavity with foam, the insulating material 710 may be applied to a thicker layer. Alternatively, one may use a single layer of standard blown foam in place of the insulating material 710, particularly if a closed cell blown foam (about 99.5% closed) becomes commercially available.

The increase in insulation effectively allows one to reduce the size of the evaporator 110, thus minimizing the size of the required compressor and condenser for the identical ice making capacity. In tests of the embodiment described here, an icemaker can achieve slightly larger amounts of produced ice using significantly less energy.

Thus, there has been shown and described a novel evaporator assembly for an ice maker, particularly useful with batch-type ice makers. It will be apparent, however, to those familiar in the art, that many changes, variations, modifications, and other uses and applications for the subject devices and methods are possible. All such changes, variations, modifications, and other uses and applications that do not depart from the spirit and scope of the invention are deemed to be covered by the invention which is limited only by the claims which follow.

What is claimed is:

1. An ice maker comprising:

a freeze plate having a front side and back side, the freeze plate configured to receive water at the front side and to form the water received at the front side into a plurality of pieces of ice;

refrigerant tubing thermally coupled to the back side of the freeze plate opposite the front side; and an evaporator housing attached to the freeze plate and defining an enclosed cavity behind the back side of the freeze plate, the evaporator housing containing the refrigerant tubing inside the enclosed cavity;

wherein the enclosed cavity is sealed water tight.

2. The ice maker as set forth in claim 1, wherein the freeze plate comprises an evaporator pan and vertical and horizontal strips arranged in the evaporator pan to define a lattice of ice cube molds.

3. The ice maker as set forth in claim 1, wherein the freeze plate has a perimeter wall and wherein the evaporator housing has a perimeter wall sealingly engaged with the perimeter wall of the freeze plate.

4. The ice maker as set forth in claim 3, wherein the ice maker comprises a gasket compressed between the perimeter wall of the freeze plate and the perimeter wall of the evaporator housing.

5. The ice maker as set forth in claim 3, wherein the evaporator housing further comprises a back wall sealingly engaged with the perimeter wall of the evaporator housing.

6. The ice maker as set forth in claim 5, further comprising a weld joint sealing the back wall to the perimeter wall of the evaporator housing.

7. The ice maker as set forth in claim 6, wherein the perimeter wall comprises a groove and the back wall comprises an edge seated in the groove, the weld joint being formed along the groove.

8. The ice maker as set forth in claim 7, wherein the edge is a raised edge.

9. The ice maker as set forth in claim 6, wherein the weld joint is formed by an ultrasonic welding process.

10. The ice maker as set forth in claim 9, wherein the perimeter wall and the back wall of the evaporator housing are formed from plastic material.

11. The ice maker as set forth in claim 8, wherein the back wall has a perimeter edge margin and wherein the raised edge extends 360° about the perimeter edge margin of the back wall.

12. The ice maker as set forth in claim 5, wherein the perimeter wall of the evaporator housing is formed from individual housing left, right, top and bottom sidewall pieces joined together.

13. The ice maker as set forth in claim 12, wherein the individual housing left, right, top and bottom sidewall pieces comprise gasket material for sealing the evaporator housing water tight.

14. The ice maker as set forth in claim 3, wherein the perimeter wall of the freeze plate comprises studs and wherein the perimeter wall of the evaporator housing is secured to the freeze plate by the studs.

15. The ice maker as set forth in claim 1, further comprising a layer of insulation formed on the refrigerant tubing and the back side of the freeze plate.

16. The ice maker as set forth in claim 15, wherein the layer of insulation comprises an integral layer of cured-in-place insulation that conforms to refrigerant tubing and the back wall of the evaporator pan and is impervious to water such that the layer of insulation has no joints through which water can leak onto the back side of the freeze plate.

17. The ice maker as set forth in claim 16, wherein there is a cavity between the layer of insulation and the evaporator housing.

18. The ice maker as set forth in claim 17, wherein the cavity is filled with another type of insulation.

19. A method of making the ice maker of claim 1, the method comprising:

sealingly attaching a perimeter wall of the evaporator housing to the freeze plate; and sealingly attaching a back wall of the evaporator housing to the perimeter wall.

20. The method of claim 19, wherein said sealingly attaching the back wall comprises ultrasonically welding the back wall to the perimeter wall to form a weld joint that seals an entire interface between the perimeter wall and the back wall water-tight.

* * * * *